Patented Jan. 10, 1950

2,494,259

UNITED STATES PATENT OFFICE 2,494,259

FIBROUS GLASS ARTICLES

Martin Emery Nordberg, Corning, N. Y., assignor to Corning Glass Works, Corning, N. Y., a corporation of New York No Drawing. Application March 20, 1946, Serial No. 655,891

8 Claims. (Cl. 106—50)

This invention, which is a continuation in part of my pending application S. N. 519,831 filed January 26, 1944, and issued February 15, 1949, as Patent No. 2,461,841, relates to the manufacture of glass fibres and it is particularly concerned with the treatment of glass fibres and fabrics thereof whereby non-siliceous constituents are removed from the fibres by a leaching process to produce highly siliceous fibres and fabrics of novel compositions having improved characteristics.

Recent advances in the art of spinning glass and the development of an ever widening field of uses for woven and unwoven fabrics and textiles of fibrous glass have led to the need for still further improvements in their methods of production and the compositions and physical characteristics of the fibres. The known methods of producing glass fibres economically in large quantities place certain limitations on the types and compositions of glasses which can be employed and thus also on the compositions and physical characteristics of the fibres which can be produced. Glasses which are adapted for the production of articles of relatively large mass, such as utensils of all sorts, electrical insulators, and the like, having the characteristics of high thermal endurance, high chemical durability, high electrical resistance, low power factor, and other desirable properties are often times totally unsuited for spinning into fibres. Some of the causes for such unsuitability are: too high melting temperatures, too high viscosities at the melting temperatures, objectionable alkalinity, tendency to form "slugs" or "shot" in the blowing process, or to break the continuous fibre in the drawing method, etc.

The primary object of this invention is to form glass fibres from compositions which are easy to work and thereafter to convert the fibres to a different composition by leaching out at least some of the fluxes used in melting the glass.

Another object is to produce glass fibres having novel compositions.

Another object is to produce glass fibres of high chemical durability, particularly toward acids.

Another object is to produce glass fibres composed of silica and refractory oxides.

Another object is to produce glass fibres having a high sorptive capacity.

Another object is to produce porous glass fibres.

Another object is to produce porous glass fibres of high silica content.

Another object is to produce porous fibres of practically pure silica which can be revitrified at low temperatures.

Another object is to produce glass fibres and felted and woven fabrics thereof which have heat resisting qualities as good or better than present materials of this form.

Another object is to produce a substitute for asbestos.

Another object is to produce a thermal insulation for high temperature use.

Another object is to improve the electrical properties of glass fibres and fabrics thereof.

Another object is to produce glass fibres and fabrics which are softer to the touch than prior glass fibres and fabrics and which are less irritating to the human skin.

To these and other ends the invention comprises glass fibres, and fabrics composed thereof, having new and useful properties which render them particularly suitable for various purposes, as will hereinafter be more fully set forth.

I have found that the leaching of fibrous glass articles to extract non-siliceous constituents, thereby changing the composition of the glass and at the same time producing strong fibrous articles, cannot be accomplished in the manner and by the methods heretofore used in the leaching and revitrification of glass articles having relatively large mass, but must conform to the critical requirements and conditions hereinafter set forth. In the first place, the preliminary heat treatment which is ordinarily employed to condition the glass for leaching or to cause a separation or formation of a soluble phase or composition dispersed within the glass mass cannot be employed in treating glass fibres. This is due to the fact that heating the fibres or fibrous materials for the necessary time at any temperature which is effective causes sintering and fusing of the fibres. Unlike massive articles, fibres are chilled almost instantly from a highly liquid to a completely solid state. This time interval is so short that it fails to permit the separation of a soluble phase such as sometimes occurs merely in the normal cooling of massive articles.

In the second place, fibres having a diameter greater than about .001 inch cannot be successfully leached, because either they are practically impermeable without a preliminary heat treatment or they crumble and disintegrate on account of breaking stresses set up in the glass during leaching. Fibres which have diameters less than about .001 inch, on the other hand, can be leached successfully because such stresses cannot become serious before the fibre is completely leached through. The use of fibres still smaller in diameter, say about .0003 inch, is advantageous not only because the leaching action is faster and the range of compositions which can be leached is broader than for fibres near .001 inch, but the weaving of fabrics requires the use of the smaller fibres and the leaching and consolidation of woven fabrics is an important feature of my invention, as will appear.

I have discovered that, subject to limitations as to composition, both borosilicates and non-borosilicates can be leached in acid solutions to extract non-siliceous constituents when in the form of fibres having diameters less than about .001 inch. In contrast to this, non-borosilicates cannot be leached satisfactorily when in massive form. Glasses, the fibres of which can be leached in accordance with this invention, contain not over 75% $SiO_2$, at least one glass flux consisting of alkali metal oxide ($R_2O$) or boric oxide, and an oxide of one or more of the following metals: beryllium, magnesium, calcium, zinc, strontium, cadmium, barium, aluminum, titanium, zirconium and thorium. During leaching the greater part, if not all, of the flux or fluxes is extracted and the final composition of the fibres comprises over 80% $SiO_2$ and a substantial amount of the said metal oxide. The leached fibres are porous but may be consolidated to a non-porous condition by suitable heating, as will be shown.

Borosilicates which contain more than about 70% $SiO_2$ cannot be leached without a preliminary heat treatment and hence fibres made of such glasses cannot be leached because they cannot be effectively heat treated, as pointed out above. On the other hand, fibres composed of borosilicate glass having diameters less than about .001 inch and containing less than about 70% $SiO_2$ leach readily in acid solutions, such as hydrochloric acid.

When the major portion of the non-siliceous constituents of alkali-borosilicate glasses forms water soluble compounds on leaching, such glasses can be leached with water. However, if the alkali content is high, the bath becomes alkaline as leaching proceeds with a resultant attack on the silica structure of the fibres. To overcome this difficulty, acid must be added to the bath. When the alkali to boric oxide ratio is low, say not more than about 1 to 5, the solution will remain essentially neutral and the addition of acid to the bath is unnecessary.

When glass fibres composed of silica, boric oxide, alkali metal oxide, and alumina, and meeting the above stated requirements as to diameter and silica content, are leached with an acid solution, the ultimate composition of the leached fibres is different from that of a massive article of the same glass heat treated and leached in the same manner. An alkali borosilicate containing about 2% $Al_2O_3$, when heat treated and leached in massive form, i. e., in a thickness substantially greater than about .001 inch, has an ultimate composition consisting of over 96% $SiO_2$, about 3% $B_2O_3$, with traces of $Al_2O_3$ and $Na_2O$, but when the same glass in the form of fibres having diameters less than .001 inch is leached in the same manner, the ultimate composition of the fibres consists of over 96% $SiO_2$, about 3% $Al_2O_3$ with traces of $B_2O_3$ and $Na_2O$.

*Example 1*

A glass having the composition 62% $SiO_2$, 8% $Na_2O$, 28% $B_2O_3$, and 2% $Al_2O_3$ was drawn into fibres of .001 inch diameter or less and the fibres were leached for ten minutes in 1 Normal aqueous hydrochloric acid maintained at 95° C. The leached fibres were thoroughly washed with water and dried. The resulting fibres on the dry basis had the composition 96.7% $SiO_2$, 3.1% $Al_2O_3$, .2% $B_2O_3$, and .03% $Na_2O$, and were very soft and pliable.

Fibres composed of borosilicate glasses which are substantially free from alkali metal oxides, but which contain substantial amounts of second group oxides and alumina, may also be leached but require an acid solution because the major portion of the non-siliceous constituents are practically insoluble in water. The initial glass should contain not more than 56% $SiO_2$, not more than about 22% total second group oxides, not less than about 12% $Al_2O_3$ and at least 5% $B_2O_3$. Such glasses have properties making them particularly suitable for drawing into glass fibres. The resulting fibres after leaching have a high silica content, 90% to 99.5% $SiO_2$, are free from alkali and contain up to 4% of alumina, up to 4% of second group oxides, and up to 4% $B_2O_3$.

*Example 2*

A roll of tape composed of glass fibres having the approximate composition 55% $SiO_2$, 13.5% $Al_2O_3$, 18% CaO, 4.5% MgO, and 9% $B_2O_3$, and having diameters less than .001 inch was leached for 24 hours in 6 Normal aqueous hydrochloric acid maintained at 98° C. The leached tape was washed with water and dried. The final composition on the dry basis was about 90.5% $SiO_2$, 3.5% $Al_2O_3$, 2.7% CaO, .7% MgO and 2.5% $B_2O_3$.

Fibres of non-borosilicate glass or glasses composed of silica, alkali metal oxide, and second group oxide, such as the oxides of beryllium, magnesium, calcium, zinc, strontium, cadmium and barium, and containing not more than about 75% $SiO_2$, leach readily, provided their alkali content is more than about 20%. As the silica content of such glasses is decreased the minimum amount of alkali metal oxide which must be present also may be decreased somewhat. The final composition of such fibres after leaching is 90% to 100% $SiO_2$, less than 10% second group metal oxide (RO) and less than 1% alkali metal oxide ($R_2O$). As the leaching time is increased the RO and $R_2O$ contents of the fibres become smaller and the silica content ultimately approaches 100%.

*Example 3*

Glass fibres having diameters less than .001 inch and composed of approximately 70% $SiO_2$, 20% $Na_2O$ and 10% CaO were leached for one hour in 1 Normal aqueous hydrochloric acid at 96° C. The leached fibres were washed, dried and fired at 800° C. and had the approximate composition 93% $SiO_2$ and 7% CaO.

Fibres having unusual compositions may be produced by means of my invention, by including the refractory metal oxides $TiO_2$, $ZrO_2$, $ThO_2$ and $Al_2O_3$, which form acid insoluble components in the resultant glass. For example, glasses composed of silica, alkali metal oxide, and zirconium oxide, the total alkali metal oxide being not less than about 25% and $ZrO_2$ being not more than about 15%, when drawn into fibres having diameters less than .001 inch and leached with an acid solution, produce glasses which consist of silica and zirconia, and containing a trace of alkali metal oxide.

Example 4

A glass consisting of 61.9% $SiO_2$, 28.6% $Na_2O$ and 9.5% $ZrO_2$ was drawn into fibres having diameters less than .001 inch, which were then leached for one hour with 1 Normal aqueous hydrochloric acid at 96° C. and thereafter washed in pure water, dried and fired at 800° C. The fibres were then found to be composed of about 88% $SiO_2$, 12% $ZrO_2$ and .25% $Na_2O$.

A similar result may be obtained when oxides of certain other metals of the fourth periodic group ($RO_2$) as titanium oxide or thorium oxide are substituted for zirconium oxide in the above glass. The final compositions of the leached fibres will contain substantially more $SiO_2$ and $RO_2$ and less $R_2O$ than the original glass.

In practicing my invention, it is essential that the leaching bath be maintained in a non-alkaline condition, i. e., either neutral or acid. As pointed out above, highly acid glasses which contain a large amount of boric oxide, and little or no alkali metal oxide, may be leached with water. In the case of highly basic glasses, such as glasses containing a high percentage of alkali metal oxide or oxide of a metal of the second periodic group, it is desirable to use a strong acid solution. Unless sufficient acid is present in the bath to neutralize all of the basic constituents of the glass, the bath may become alkaline and the silica of the fibres may be dissolved, thereby causing their disintegration.

On account of the small dimensions of the fibres and the small depth to which the leaching action must penetrate in order to permeate the fibres, the leaching time is relatively short but may vary from ten minutes to an hour or more, depending upon the concentration of the acid in the leaching bath and its temperature. The speed of leaching, in general, may be increased by increasing the acid concentration and/or increasing the temperature. When leaching is completed, the fibres should be thoroughly washed with pure water. A leaching time up to several hours is required for compacted masses of fibres or exceedingly thick and tightly woven fabrics, because the diffusion of the solvent into the mass becomes relatively slow.

Glass fibres which have been leached in accordance with the methods described above are porous and have a somewhat lower tensile strength than the original fibres as drawn. I have determined that the pores of the leached fibres are smaller than those occurring in porous glasses which have been leached in massive form. For this reason, despite their smaller capacity, water is more strongly retained in the porous glass fibres than in massive porous glass. I have found that the glass fibres retain about 10% of their weight of water after being heated for several hours at 150° C. A major proportion of this residual water can be removed by more drastic treatment, such as heating at 175° C. in vacuo. The resultant material is a powerful dessicant.

I have discovered that such porous leached glass fibres can be consolidated, i. e., revitrified or converted to non-porous vitreous glass fibres by heating them at temperatures well below the temperatures which are required to consolidate similar porous glasses in massive form. Were it not for this fact, it would be difficult to consolidate the porous fibres without surface devitrification or sintering, which would seriously weaken the resultant fabric. Porous fibres composed of approximately 97% $SiO_2$ and 3% $Al_2O_3$ become consolidated or non-porous when heated for ten minutes at 800° C., or several hours at 600° C. The ability to consolidate at such low temperatures is compatible with the increased surface energy of the porous fibres.

On account of the novel characteristics of such small dimensional glass fibres during leaching and consolidation, I have found it highly advantageous to first form the fibres into the desired woven or unwoven articles before leaching. Felted or woven glass fibres can be leached and consolidated as readily as individual fibres with a great saving in time, materials and overhead costs.

It is customary in the spinning of glass to coat the fibres with a lubricant such as an oil, wax, or other greasy or unctuous material in order to prevent abrasion of the fibres during spinning and during their fabrication into woven or unwoven fabrics. I have found that such coatings do not interfere substantially with my new process and that leaching and revitrification of the fibres can be carried out in their presence. However, such coating materials contaminate the leaching bath and leave an organic residue which is sometimes difficult to eliminate from the porous fibres during subsequent heat treatment and may cause discoloration of the final fibres. Hence it is usually preferable to remove the coating, either by heating the fabric at about 300° C. or by treating it with a solvent before subjecting it to the leaching operation. As pointed out above, the unusually low temperature at which the porous fibres may be consolidated despite their high silica content permits complete conversion of the fibres of the treated fabrics to a non-porous condition without sintering or fusing the fibres and without undue loss of tensile strength. If desired, the consolidated fibres or fabric may be relubricated or coated with lubricant material after consolidation.

Fibres and fabrics thereof which have been leached and consolidated in accordance with my invention are unique in their texture and softness as compared to ordinary glass fibres and fabrics. The new fabrics are remarkably soft and pliant to the touch and feel more comparable to the fabrics composed of silk or cotton fibres than prior fibrous glass articles. As a result of their high silica content, they also possess the property of considerably higher heat resistance than prior glass fabrics and afford an excellent substitute for asbestos fabrics. The new glass fabric is stable at temperatures above 400° C., at which asbestos dehydrates and disintegrates. Consequently, the new fabric has been found to be very useful as an insulating material for use at temperatures ranging from 400° C. to 1200° C. A further advantage resulting from their composition is the improved electrical resistance and low power factor of the new glass fabrics which together with their increased heat resistance makes them still more desirable for the insulation of wires and electrical conductors which are to be employed under conditions of elevated temperatures, such as the windings of electric motors.

For some purposes it is desirable to omit the step of revitrification and to leave the fibres porous. It has been found that the porous fibres have strong absorptive powers for liquids and vapors. The porous fibres are therefore particularly useful in filters and selective absorption devices for the purification of air and other gases.

I claim:

1. An article comprising glass fibres which have a diameter less than .001 inch and which consist approximately of 90.5% SiO₂, 3.5% Al₂O₃, 2.7% CaO, .7% MgO, and 2.5% B₂O₃ the fibres being porous.

2. An article comprising glass fibres which have a diameter less than .001 inch and which consist approximately of 90.5% SiO₂, 3.5% Al₂O₃, 2.7% CaO, .7% MgO, and 2.5% B₂O₃ the fibres being vitreous and non-porous.

3. An article comprising glass fibres which have a diameter less than .001 inch and which consists essentially of at least 88% SiO₂, the indicated amount of at least one glass flux selected from the group consisting of up to 1% alkali metal oxide and up to 4% B₂O₃, and at least one additional glass-forming oxide in the indicated amount selected from the class consisting of up to 10% BeO, up to 10% MgO, up to 10% CaO, up to 10% ZnO, up to 10% SrO, up to 10% CdO, up to 10% BaO, up to 4% Al₂O₃, up to 12% TiO₂, up to 12% ZrO₂ and up to 12% ThO₂, the fibres being porous.

4. An article comprising glass fibres which have a diameter less than .001 inch and which consists essentially of at least 88% SiO₂, the indicated amount of at least one glass flux selected from the group consisting of up to 1% alkali metal oxide and up to 4% B₂O₃, and at least one additional glass-forming oxide in the indicated amount selected from the class consisting of up to 10% BeO, up to 10% MgO, up to 10% CaO, up to 10% ZnO, up to 10% SrO, up to 10% CdO, up to 10% BaO, up to 4% Al₂O₃, up to 12% TiO₂, up to 12% ZrO₂ and up to 12% ThO₂, the fibres being vitreous and non-porous.

5. An article comprising glass fibres which have a diameter less than .001 inch and which consist of SiO₂ containing 3.1% Al₂O₃, .2% B₂O₃ and .03% Na₂O, the fibres being porous.

6. An article comprising glass fibres which have a diameter less than .001 inch and which consist of SiO₂ containing 3.1% Al₂O₃, .2% B₂O₃ and .03% Na₂O, the fibres being vitreous and non-porous.

7. An article comprising glass fibres which have a diameter less than .001 inch and which consist of SiO₂ containing 12% ZrO₂ and .25% Na₂O, the fibres being porous.

8. An article comprising glass fibres which have a diameter less than .001 inch and which consist of SiO₂ containing 12% ZrO₂ and .25% Na₂O, the fibres being vitreous and non-porous.

MARTIN EMERY NORDBERG.

REFERENCES CITED

The following references are of record in the file of this patent:

UNITED STATES PATENTS

| Number | Name | Date |
|---|---|---|
| 2,106,744 | Hood et al. | Feb. 1, 1938 |
| 2,252,466 | Hanlein | Aug. 12, 1941 |
| 2,286,275 | Hood et al. | June 16, 1942 |